May 15, 1934. V. H. TURKINGTON 1,958,452
SHOCK RESISTANT MATERIAL
Filed Nov. 10, 1928
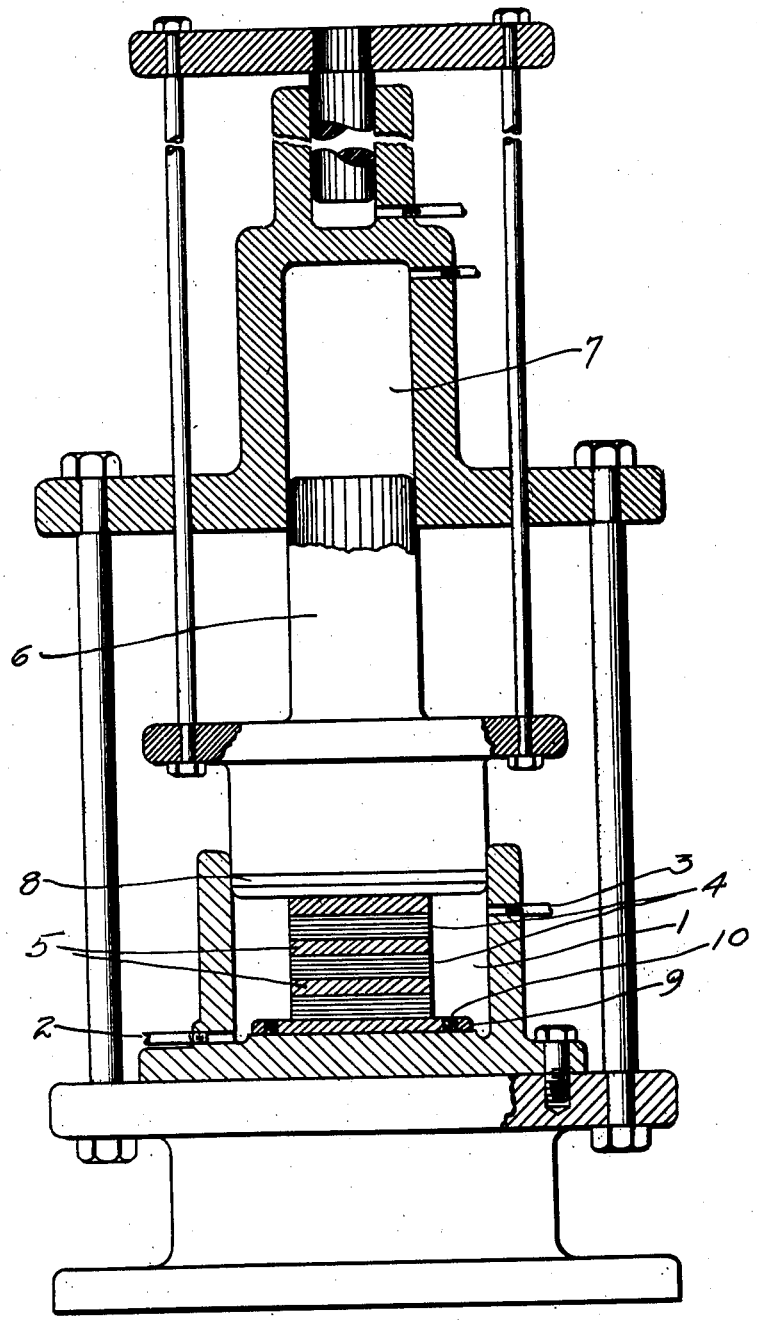
INVENTOR.
Victor H. Turkington
BY Jos. N. Nielsen
ATTORNEYS.

Patented May 15, 1934

1,958,452

UNITED STATES PATENT OFFICE 1,958,452

SHOCK RESISTANT MATERIAL

Victor H. Turkington, Caldwell, N. J., assignor to Bakelite Corporation, New York, N. Y., a corporation of Delaware Application November 10, 1928, Serial No. 318,440

8 Claims. (Cl. 154—2)

This invention relates to compositions comprising a fibrous filler and a binder that are molded or otherwise formed into materials or directly into articles by means of the applications of heat and pressure, and more particularly into materials of a laminated character comprising fibrous sheets bonded together under heat and pressure and specifically intended to be machined into articles, such as noiseless gears and the like, wherein high impact strength and a minimum of swelling in the presence of moisture or oils are of importance.

Commercial methods in common use for producing bonded laminated materials designed for noiseless gears consist essentially of the following steps:

(a) a woven fabric is impregnated with a solution of a potentially reactive resinoid, that is, a synthetic resin-like product usually obtained by the condensation of a phenol with formaldehyde and differing from resins in that it is obtainable in a form or A stage wherein it is fusible and soluble but convertible to a hard, infusible and insoluble form or C stage by the application of heat and therefore designated when in a A condition as potentially reactive;

(b) the impregnated fabric is cut to suitable size and built up into packs either in the form of flat sheets or other more or less complicated shapes;

(c) heat and pressure are then applied to a pack until the resinoid binder is converted or reacted to its hard infusible form.

Reacted materials made as above are characterized by a dense structure and sufficient resistance to impact and wear to make them suitable for machining into gears and similar articles. While they are much more resistant to moisture than raw hide, formerly used for this purpose, they are nevertheless affected to a sufficient extent by moisture and/or heat to result in some swelling; and for such uses as automobile timing gears where gear teeth are accurately cut and fitted, slight swellings result in binding and excessive wear in spots, with consequent noise.

The present invention provides materials which in their reacted or converted form are superior to those above mentioned in comparative freedom from swelling or change in dimensions under severe conditions of heat or moisture or both to the extent that they are particularly useful for manufacture into gears. Articles made therefrom are furthermore suprisingly superior to those obtained from bonded materials in common use in their mechanical strength, a property which is evidently highly desirable on account of the economies of design that are possible with a stronger material, and also in their marked resistance to wear; tests have shown that gears made from the materials of the present invention have run with about one-tenth of the surface wear that occurs with gears cut from hitherto known compositions. They likewise appear to have the property of elasticity to the degree that gears cut therefrom intermesh with more than one pair of teeth in contact; this is evidenced by the high power transmission without breakage.

Briefly stated, the improved materials of the present invention are obtained by producing in the bonding medium small voids or pores resulting in a honeycomb or spongelike structure; that is, the bonding structure is probably either vesiculated or formed as a network. I may, however, obtain results substantially equivalent to those of a structure containing voids by a mixture of substances, part or all of which may be binders and each having distinctive properties, and admixed in such a manner as to secure non-continuity of either one of the binders; for example, a phenol-formaldehyde resinous product of the type described in the Patents 942,699, 942,700 and 942,809 granted to Baekeland on December 7, 1909, may form one ingredient, and a flexible resinous product of the type described by Byck in Patent 1,590,079 granted June 22, 1926, may form the other. For convenience I shall denominate the resulting physical structure of the binder as porous including thereby those structures wherein the voids or pores are filled temporarily or permanently with some third ingredient.

A specific method of securing a porous structure comprises preparing a composition by impregnating a woven fabric with a solution of a potentially reactive resinoid and driving off the solvent by heat. (The term "potentially reactive resinoid", referring to the resin-like product in a fusible and soluble condition but convertible to a hard infusible, insoluble condition by heating, includes not only phenol formaldehyde resinoids, but also phthalic anhydride-glycerol resinoids and in general all such resinous substances which may be set to a hardened condition and rendered substantially infusible by heating.) The impregnated fabric is then soaked in water until thoroughly saturated, after which it is cut and built up into packs, or the packs can be made up from impregnated fabric and then soaked, and finally subjected to heat and pressure in substantially the same manner now used in the art, or preferably in a manner hereinafter to be described.

In following the customary pressing or molding procedure, a large part of the excess water is forced out and an additional amount may be lost by evaporation. However, part of the water remains while the resinoid is reaching the stage where it is set and will no longer flow under applied pressure, this water occupying a portion of the total volume and being intimately mixed with the resinoid and filler. During the latter stages of the heating period, or in a subsequent heating after removal from the press, most of the remaining water is expelled leaving a vast number of very minute pores in the material. It is usually desirable, however, to leave a certain amount of water in the material, say 2% to 6% of the weight of the finished piece, as this tends to preserve the strength of the cellulose filling material. The beneficial effects of water on the strength of cellulose fibers are well known and need not be described here except to mention that if all of the water is driven out by heating, the material will not be as strong as when a relatively small percentage is allowed to remain, and that the strength of an article dried to such an extent is increased by soaking the finished dry piece in water or even by storing for some time in a humid atmosphere.

It will be evident that considerable variation in the structure of the material can be produced by varying the amount of water used, and also by varying the conditions of pressing, such as time, temperature and pressure. If closed molds are used, which are comparatively gas tight, the amount of water escaping during the pressing and heating is much less than when the material is merely pressed between metal plates as in the production of flat sheets.

It will also be evident that water is not the only ingredient suitable for producing a porous structure containing voids as described above, and in general any liquid or solid may be used which is sufficiently volatile to be driven out of the material at temperatures obtainable in commercial practice, either at atmospheric pressure or under reduced pressure. For example, the solvents used in the preparation of a resinoid solution, with which the fabric or the filler is impregnated, can be retained in whole or in part instead of substituting water or other liquid in the pack of superposed laminations built therefrom. It is usually found more satisfactory, however, to use such as are not solvents for the synthetic resinoid.

Instead of soaking the resinoid impregnated fabric or other composition in water or other liquid, other means can be used for applying it. For instance, the composition can be placed in a chamber where the humidity or vapor concentration may be controlled to secure a definite amount of the liquid in the fabric; or the liquid can be sprayed thereon. Another method is the use in the fabric impregnating step of a solution of the resinoid in a mixture of solvents containing a considerable amount of water or other ingredient and then controlling the drying operation so as to leave the desired amount of water or other ingredient in the resinoid-impregnated fabric.

As another modification of this process a hygroscopic salt or fluid can be added to the solution, such for instance as calcium chloride or glycerin, which serves to raise the boiling point of the solution and prevent the escape of the water or other volatile constituent until after the resinoid has become set. The hygroscopic material may be allowed to remain in the finished piece or it may be leached out by soaking in hot water, the latter method producing a still more porous material.

As still another modification, there can be added either to the resinoid ingredients or, as an impregnating solution, a substance capable of being partly or completely decomposed to a gas at the molding temperature, as for example a salt, such as ammonium carbonate, dissolved in water.

Whatever the means employed, the feature regarded as important for the purposes of this invention as covered more specifically in the present application is that the resinoid-impregnated fabric, at the beginning of the pressing and heating operation, shall contain or engender a third ingredient to occupy space until the resinoid is set and, if necessary, capable of then being driven out of the material by heating at temperatures obtainable in commercial practice or capable of being dissolved out by soaking in a suitable solvent.

While the use of woven fabric in laminations is specified in the above description, it will be understood that the same principle may also be applied to felted or paper sheets, or to molding compounds containing fabric or other fillers, such as chopped canvas or cloth scrap, cotton flock, wood flour, asbestos or other filling materials. It is evident too that the invention is not restricted to any specific type of binder, but that binders which set upon heating generally known in the art can be modified in structure in accordance with this disclosure.

Special apparatus is not essential for carrying out this invention, other than the common type of heated hydraulic press, but better results can be obtained and better control of the process maintained in a special type of press. This press is shown in the figure of the accompanying drawing, which figure is a longitudinal vertical section of the press.

The press consists of a chamber 1 which is capable of withstanding a pressure of at least 150 lbs. per square inch. The chamber is fitted with pipe connections 2 and 3 for providing circulation of the heating medium which may be steam, hot oil, or any other gaseous or liquid material which may be best suited to the various modifications of the process as outlined above. The resinoid-impregnated pack 4 is placed inside the chamber between spacing plates 5, or steel molds may be filled with the material and assembled in a stack where it is desired to produce molded shapes other than flat sheets. Hydraulic pressure is applied through a ram 6 operating in a hydraulic cylinder 7. A piston ring 8 is used to seal the pressure chamber, or a gasket may be substituted to be squeezed by the hydraulic pressure against the walls to make a tight joint. Other means may be used to seal the chamber, such as an ordinary stuffing box.

This type of apparatus has the advantage that whatever volatile ingredient is included in the mixture for producing the porous structure as described above, may be retained in the material in the desired quantity and for the desired length of time and there is no tendency for the center of the piece to differ in composition or structure from the outer portions. The heat is quickly and uniformly transmitted to the whole mass of material.

Another advantage of this type of press is that capacity is considerably increased due to the absence of a multiplicity of hollow heated platens, the loading space being correspondingly increased. The heating connections to these multiple platens in the ordinary type of press are also cumbersome and a source of constant trouble, and the difficulty of obtaining uniformity of heating in a multiple platen press is also well known. This pressure chamber type of press overcomes both of these difficulties, for a heated fluid can be circulated in the chamber 1, if necessary, to supply the heat required which is readily transmitted through the spacing plates or molds.

For convenience in loading and unloading, the chamber may be arranged so that it can be swung or moved to one side allowing free access to the top. A loading rack 9 can be provided so that the entire charge may be assembled and lowered into the chamber at one time by hand-holds removably threaded into the openings 10 or in any other suitable manner.

Materials made in accordance with this invention and characterized by a porous structure have an unusually high resistance to impact; and although they are not impervious to water and may actually absorb greater percentages of water by weight than present commercial materials, they do not swell as much and do not warp or crack when immersed for long periods of time in either hot or cold water. This property makes them especially adapted for mechanical uses and for articles which are frequently or continuously in contact with water or moisture, such as handles, washing machine agitators, etc., as well as gears and similar articles.

A further advantage is that materials made from compositions of the present invention containing water or other volatile, are lighter in weight due to the porosity of the resulting structure and therefore effect savings in the amount required to produce an article of any given size or volume. This saving, in some cases, amounts to 20% or more, as compared to articles formed in accordance with practice of the hitherto known art. The lightness in weight, aside from the saving in material, is also advantageous for many articles, as, for instance, table tops and other pieces of furniture, etc. Whereas present materials made from cotton duck and phenol-formaldehyde resinoids have a specific gravity of 1.34 to 1.38, the materials made from the same ingredients and incorporated in accordance with this invention, have a much lower specific gravity ranging from 1.30 down to 1.00 or less than 1.00. Where other types of resinoids and fillers are used, the specific gravities will, of course, be different from the above figures, but in general, the specific gravity of any mixture treated in accordance with this invention will be less than it would be if treated in accordance with prior art methods.

I claim:

1. A process of preparing materials which comprises incorporating a fibrous filler with a resinoid binder, saturating the resulting product with water, setting the resinoid binder by the action of heat together with the application of pressure while water is present, and thereupon removing said water.

2. A material for gear stock comprising layers of fabric secured by a binder in a porous state and including from 2 to 6 per cent of moisture.

3. A material comprising a fibrous filler and a binder in its final set condition, said binder having a porous structure and consisting of a member of the phenolic or phthalic anhydride resinoid group.

4. A material comprising superposed fibrous sheets and an infusible resinoid binder having a porous structure securing said sheets together and substantially chemically inert to water.

5. A product prepared from a composition comprising a woven-cotton fabric and a porous phenol-formaldehyde resinoid set to an infusible condition under the action of heat and pressure and having a specific gravity of 1.30 or less.

6. A product prepared from a composition comprising a fibrous filler and a porous resinoid set to an infusible condition under the action of heat and pressure and having a density materially less than the sum of the absolute densities of the components.

7. Process of preparing materials which comprises incorporating a fibrous filler with a resinoid binder and an associated ingredient, and setting the resinoid under the combined action of heat and pressure in the presence of the ingredient to cause a reticulated or porous formation of the binder.

8. A gear stock material comprising sections of fabric secured by a porous phenolic aldehydic binder including from 2 to 6 per cent of moisture.

VICTOR H. TURKINGTON.